(12) United States Patent
De Queiroz et al.

(10) Patent No.: US 8,262,151 B2
(45) Date of Patent: Sep. 11, 2012

(54) EXTENSION WITH IMPROVED SUPPORT

(75) Inventors: Wilder De Queiroz, Vitry le Francois (FR); Thierry Derchu, Bar le Duc (FR); Raymond Deslande, Loisy sur Marne (FR)

(73) Assignee: ArcelorMittal Tubular Products Vitry, Vitry-le-Francois (FR)

( * ) Notice: Subject to any disclaimer, the term of this patent is extended or adjusted under 35 U.S.C. 154(b) by 308 days.

(21) Appl. No.: 12/596,838

(22) PCT Filed: Apr. 24, 2008

(86) PCT No.: PCT/FR2008/000591
§ 371 (c)(1),
(2), (4) Date: Oct. 21, 2009

(87) PCT Pub. No.: WO2008/145863
PCT Pub. Date: Dec. 4, 2008

(65) Prior Publication Data
US 2010/0194126 A1    Aug. 5, 2010

(30) Foreign Application Priority Data
Apr. 26, 2007  (FR) ...................... 07 03035

(51) Int. Cl.
*B60J 7/00*  (2006.01)
(52) U.S. Cl. ................................. 296/187.01
(58) Field of Classification Search ............ 296/187.01, 296/29, 30; 248/56; 52/282.4
See application file for complete search history.

(56) References Cited

U.S. PATENT DOCUMENTS

| | | | | |
|---|---|---|---|---|
| 4,405,148 A * | 9/1983 | Dickerson | | 280/491.5 |
| 4,633,238 A * | 12/1986 | Goessler et al. | | 340/593 |
| 5,011,201 A * | 4/1991 | Takahashi et al. | | 296/203.02 |
| 5,573,299 A * | 11/1996 | Masuda | | 296/193.09 |
| 5,764,844 A * | 6/1998 | Mendes | | 385/135 |
| 6,042,163 A * | 3/2000 | Reiffer | | 293/155 |
| 6,283,539 B1 * | 9/2001 | Enning et al. | | 296/203.03 |
| 6,474,709 B2 * | 11/2002 | Artner | | 293/133 |
| 6,666,500 B2 * | 12/2003 | Polzer et al. | | 296/187.12 |
| 6,705,668 B1 * | 3/2004 | Makita et al. | | 296/187.03 |
| 6,746,038 B2 * | 6/2004 | McCoy et al. | | 280/495 |
| 6,893,078 B2 * | 5/2005 | Saeki | | 296/187.09 |
| 6,923,492 B2 * | 8/2005 | Okazaki et al. | | 296/146.6 |
| 6,938,950 B2 * | 9/2005 | Nagafuchi et al. | | 296/203.02 |
| 7,021,646 B1 * | 4/2006 | Cheng et al. | | 280/495 |
| 7,066,509 B2 * | 6/2006 | Kollaritsch et al. | | 293/133 |
| 7,070,228 B2 * | 7/2006 | Shimizu et al. | | 296/187.01 |

(Continued)

FOREIGN PATENT DOCUMENTS

DE         26 25 724        12/1977

(Continued)

*Primary Examiner* — Kiran B Patel
(74) *Attorney, Agent, or Firm* — Oblon, Spivak, McClelland, Maier & Neustadt, L.L.P.

(57) ABSTRACT

An elongate mechanical device for vehicles, for absorbing impacts, which includes a profiled or tubular elongate part of polygonal cross section, and an end part mounted at one end of the elongate part, at an angle perpendicular to the axis of the elongate part, and intended for fastening to other elements. In the vicinity of its end, the elongate part includes cutouts, which create adjusted regions or faces, in the vicinity of edges of its cross section, and a rigid fastening is provided between the elongate part and the end part that maintains the adjusted regions in direct contact with the end part, the adjusted regions being dimensioned to withstand compressive loads and a tilting torque during impacts.

15 Claims, 8 Drawing Sheets

Section A-A

U.S. PATENT DOCUMENTS

| | | |
|---|---|---|
| 7,188,877 B2 * | 3/2007 | Gonzalez et al. .............. 293/133 |
| 7,520,560 B2 * | 4/2009 | Frank et al. .............. 296/193.05 |
| 7,690,672 B2 * | 4/2010 | Scruggs .................... 280/491.2 |
| 8,042,860 B2 * | 10/2011 | Takahashi et al. ......... 296/146.6 |
| 2002/0153719 A1 | 10/2002 | Taguchi |
| 2004/0189055 A1 * | 9/2004 | Tomita .................... 296/203.02 |
| 2006/0181072 A1 | 8/2006 | Tamura et al. |
| 2006/0255602 A1 * | 11/2006 | Evans .......................... 293/120 |
| 2006/0290150 A1 | 12/2006 | Roll et al. |
| 2007/0176442 A1 * | 8/2007 | Mori et al. ................... 293/133 |
| 2008/0116719 A1 * | 5/2008 | Bae ......................... 296/187.09 |
| 2008/0224487 A1 * | 9/2008 | Wang et al. .................. 293/132 |
| 2009/0039677 A1 * | 2/2009 | Lee .......................... 296/187.03 |

FOREIGN PATENT DOCUMENTS

| | | |
|---|---|---|
| DE | 195 17 922 | 11/1996 |
| DE | 197 51 513 | 6/1999 |
| EP | 1 251 054 | 10/2002 |
| EP | 1 384 536 | 1/2004 |
| EP | 1 653 113 | 5/2006 |
| EP | 1 736 369 | 12/2006 |
| GB | 1 396 388 | 6/1975 |
| JP | 2002 249067 | 9/2002 |
| JP | 2004 189062 | 7/2004 |
| JP | 2005 104236 | 4/2005 |
| JP | 2005 104335 | 4/2005 |

* cited by examiner

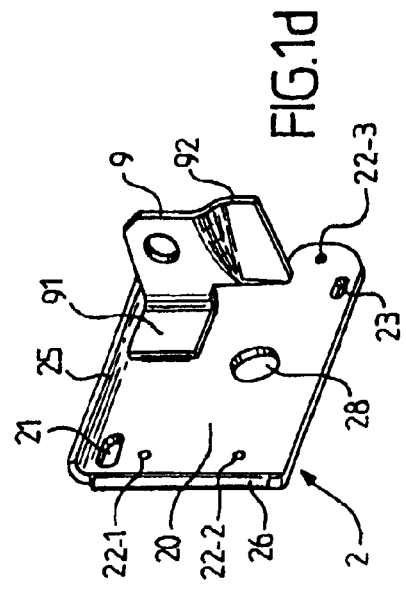
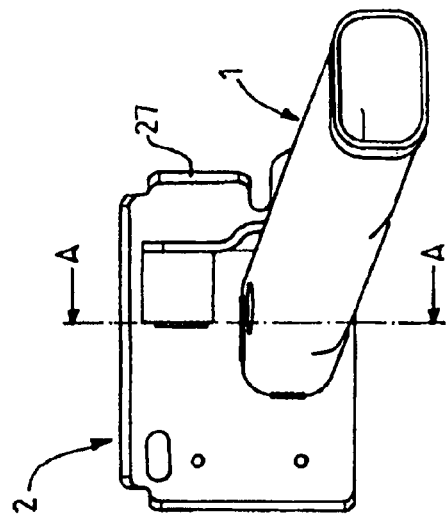
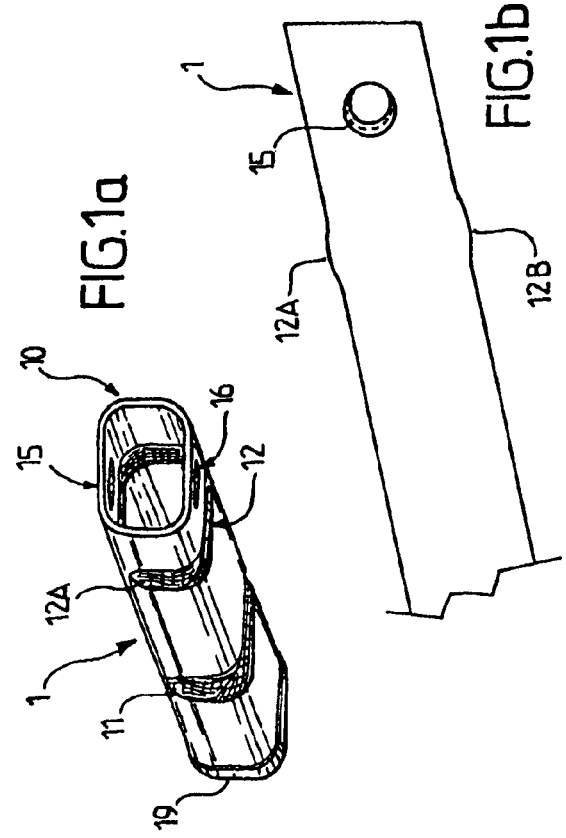
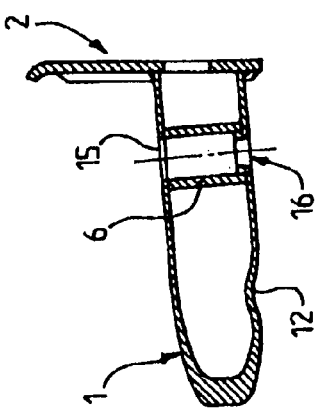
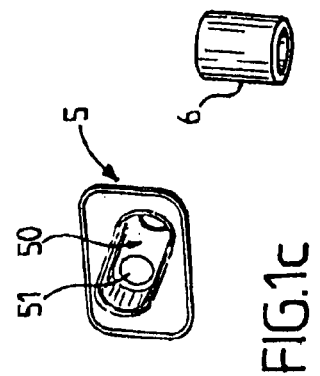

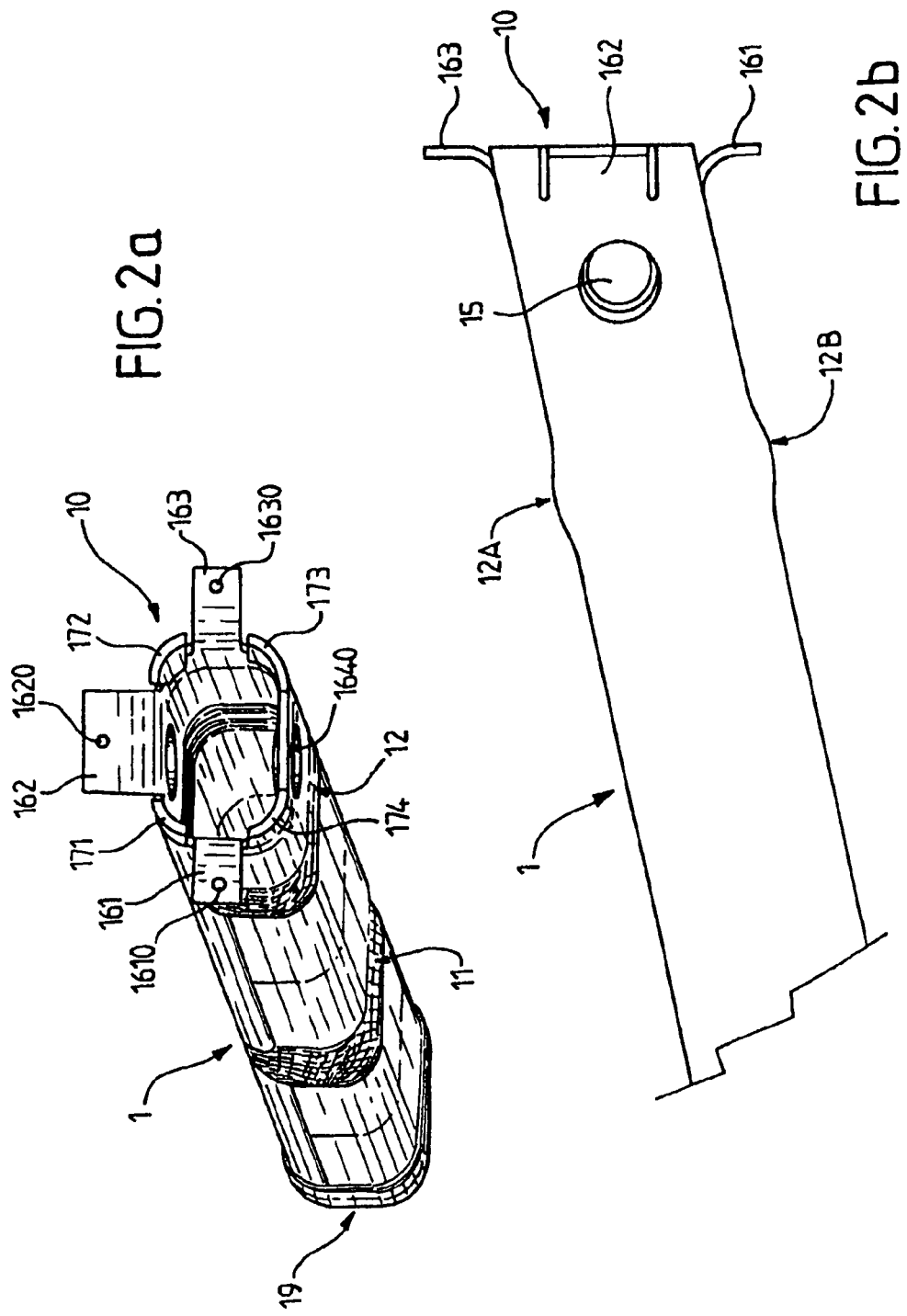

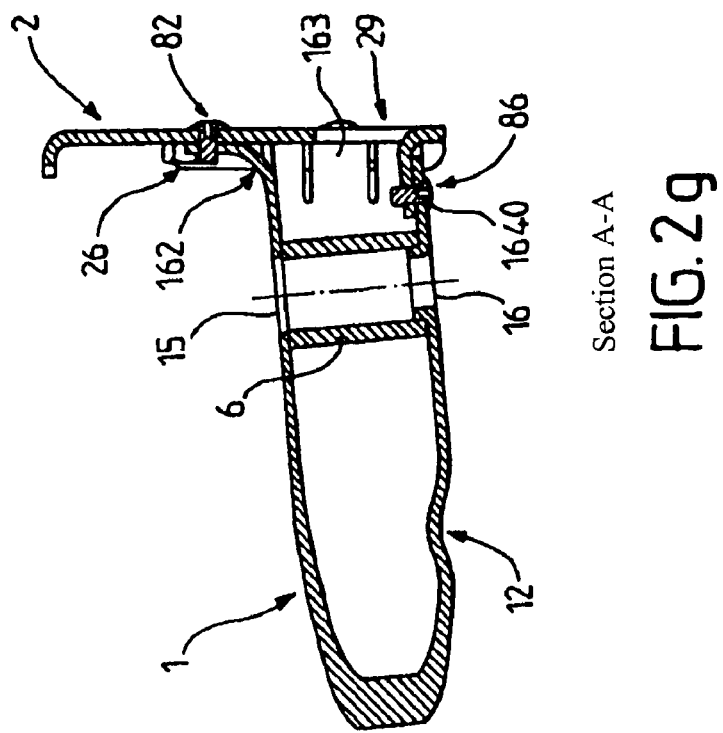
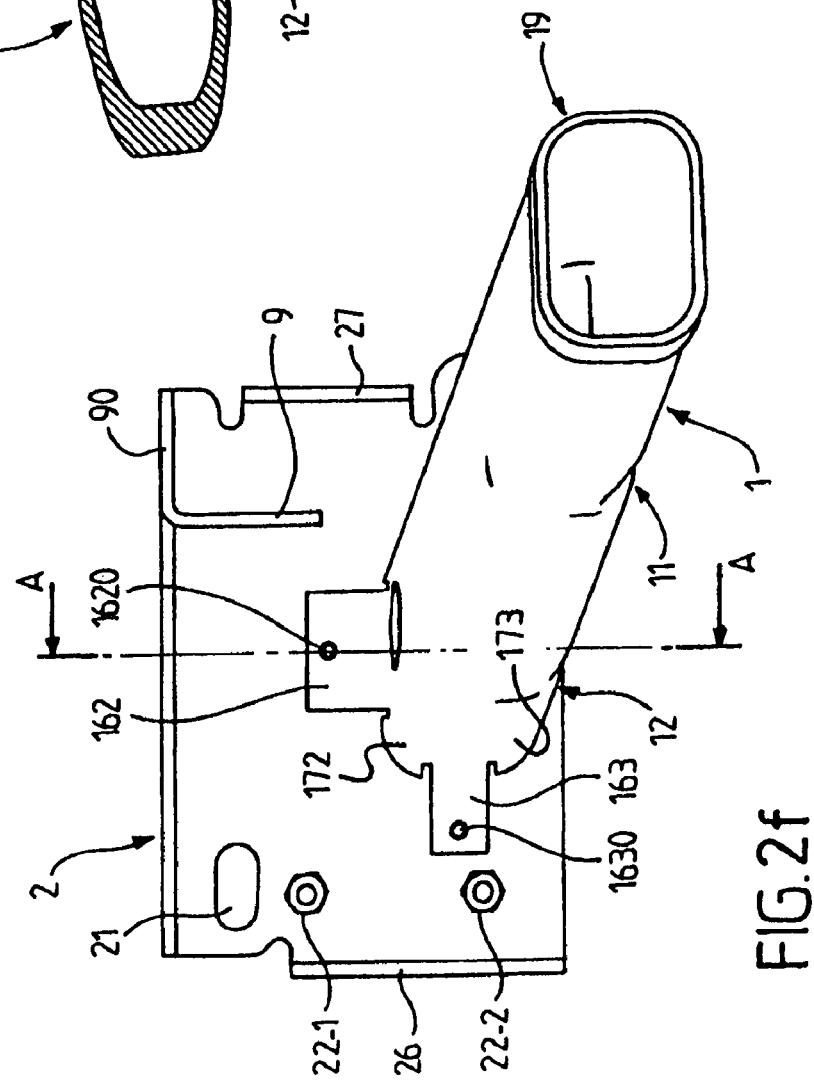

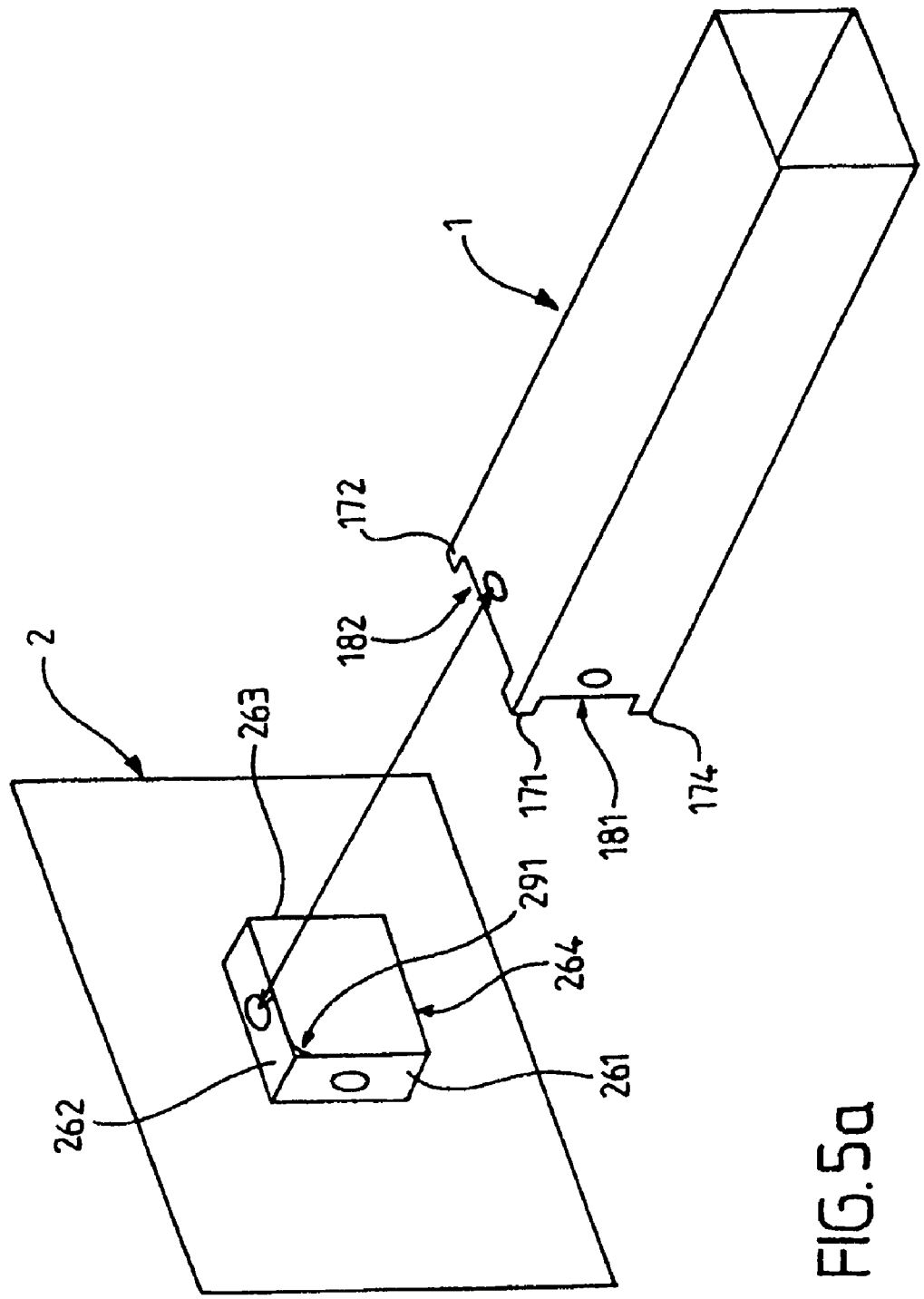

though with the specification for impact at low, moderate and high speed,

EXTENSION WITH IMPROVED SUPPORT

BACKGROUND OF THE INVENTION

1. Field of the Invention

The invention relates to safety components for vehicles.

2. Description of the Related Art

The front tracks of motor vehicles are often fitted with a safety device intended to come into play in the event of impact, made up of two assemblies of longitudinal parts placed on each side between the front of the vehicle and the chassis or cradle thereof. At the front, these two assemblies are interconnected by a cross-member referred to as the connecting bar. The connecting bar is itself connected, via two crash cushions, to means for protecting pedestrians, known as pedestrian crossbars or bumpers, located right at the front. The crash cushions are sometimes integrated in the pedestrian crossbar. An assembly of this kind is intended to meet precise specifications as to behaviour in the event of impact.

A longitudinal assembly of this kind most frequently includes the following elements:
- a tube having modifications selected so as to comply with the specification for impact at low, moderate and high speed,
- an end part, known as the "front plate", placed at the end of the tube, at the front of the vehicle; this front plate is generally perpendicular to the axis of the tube, or else inclined by a few dozen degrees thereto. It is provided with means enabling other elements to be attached to the front of the vehicle such as the crash cushion, or pedestrian crossbar, for example
- opposite it, a second end part located at the rear part of the "tube". This has the function of positioning, during impact, the component that bears against the chassis or front cradle of the vehicle
- and optionally other components.

The terminology used to designate these components is not totally fixed and there are numerous terms such as "extension", "extender", "side member" or "add-on".

Originally, the term "extension" referred to the tube itself and tube extensions are described in particular in French Patent Applications FR 2 855 805 or FR 2 887 211 of this Applicant. Nowadays, the extension tends to mean the whole assembly and the tube itself is referred to as the "side member". The word "extender" also tends to mean the assembly as a whole. Similarly, the term "add-on" also tends to mean the assembly as a whole.

In the present application, the word "extension" refers to the whole assembly.

Currently, the elements of the extension are generally steel parts welded together. They may also be made of aluminium.

Crash scenarios are described in the specifications of motor manufacturers. The essential point is the behaviour of the vehicle in a high speed crash; however, it is also important that, in low speed impacts, numerous components including the extension remain substantially undeformed, so that repairs can be carried out simply by replacing the parts that are intended to deform, such as the bumpers. This is what is known as "repairable" impact.

Moreover, in the different scenarios, it is common for the forces absorbed by the components not to be exerted along the axis of the extension. In such cases, the forces exerted on the extension may break down into an axial stress and a torque. This complicates the role of the extension, which is to absorb all or some of the energy generated by the impact.

The components proposed in French Patent Applications FR 2 855 805 or FR 2 887 211 make it possible to respond satisfactorily to different cases of frontal impact, whether they are low speed crashes (or so-called "pedestrian" impacts or "repairable" impacts) or high speed crashes.

The Applicant has set out to provide improvements to the solutions currently in use, notably in the light of different complementary constraints the importance of which has been recognised more recently, and which will be discussed further on.

BRIEF SUMMARY OF THE INVENTION

The invention relates to a mechanical device forming an elongated structural element of a vehicle, intended to at least partially absorb some impacts, comprising:
- a profiled or tubular elongate part of generally polygonal, closed or open cross-section,
- a first end part mounted at a first end of the elongate part, at an angle that is substantially perpendicular to the axis of the elongate part, this first end part being intended to be fixed to other components of the vehicle.

According to a main feature of the invention:
- close to its first end, the elongated part comprises cut-outs which create adjusted zones or edges in the vicinity of edges of its cross-section,
- between the elongate part and the first end part there is a rigid fixing which holds the adjusted zones substantially bearing directly on the first end part.

Thus, the adjusted zones can be dimensioned so as to withstand compressive forces and a tilting torque during impact, for example of the "repairable" type. For its part, the rigid fixing is charged with maintaining the position of abutment under the same impact conditions.

BRIEF DESCRIPTION OF THE DRAWINGS

Further features and advantages of the invention will become apparent from a study of the detailed description that follows, and the accompanying drawings, wherein:

FIG. 1a is a perspective view of the tube of an extension of a known type, supplemented with imaginary lines to demonstrate its shape more clearly, FIG. 1b is a plan view of the extension tube of FIG. 1a, FIG. 1c is a perspective view of an end part intended to work with the extension tube in FIG. 1a, FIG. 1d is a perspective view of a panel or plate intended to be fixed to the other end of the extension tube in FIG. 1a, FIG. 1e is a perspective view of an elongated ring adapted to cooperate with the extension tube, FIG. 1f is a perspective view showing the extension tube of FIG. 1a fixed to the plate in FIG. 1d, FIG. 1g is a section on section line AA in FIG. 1f.

Figure 2C:
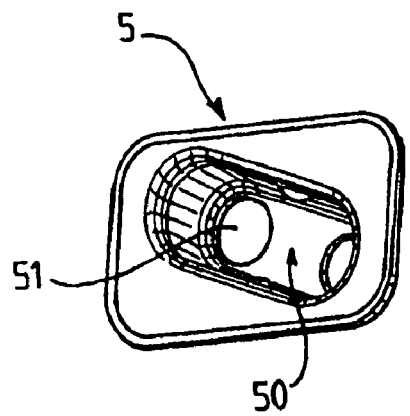
FIG. 2a is a perspective view of an extension tube as proposed here, supplemented with imaginary lines to demonstrate its shape more clearly.
FIG. 2b is a plan view of the extension tube of FIG. 2a, FIG. 2c is a perspective view of an end part intended to work with the extension tube in FIG. 2a, FIG. 2d is a perspective view of a panel or plate intended to be fixed to the other end of the extension tube in FIG. 2a, FIG. 2e is a perspective view of an elongated ring adapted to cooperate with the extension tube in FIG. 2a, FIG. 2f is a perspective view showing the extension tube of FIG. 2a fixed to the panel in FIG. 2d.
FIG. 2g is a section on section line AA in FIG. 2f.

The drawings and description that follow essentially contain elements of a definite nature. They may therefore serve not only to assist with the understanding of the present invention but may also contribute to its definition, in some cases.

DETAILED DESCRIPTION OF THE INVENTION

In FIG. 1a, the extension tube 1 is of substantially rectangular cross-section in this case.

This tube 1 has alterations such as 11 and 12, the position and shape of which are well defined. In the example shown in which the tube measures about 530 mm long:

- a first alteration is provided about 193 mm from the left-hand end, by recessing to a depth of about 9 mm, forming a hollow the width of which at the edges is about 50 mm;
- a second alteration is provided about 429 mm from the left-hand end, by recessing to a depth of about 4 mm, forming a hollow the width of which at the edges is about 40 mm.

Bulges appear opposite each alteration, in the perpendicular direction.

These alterations may be formed in one of the ways described in FR 2 855 805.

The end 10 of the extension is machined straight in a plane which in this case is at an oblique angle to the axis of the tube. Holes 15 and 16 are provided close to this end 10.

The other end 19 is shaped into a flare which assists with the assembly of the end part in FIG. 1c, as will be seen.

The plan view of FIG. 1b shows bulges 12A and 12B which correspond to the lateral bulges 12A and 12B forming the counterpart to the hollow 12 (this is an "alteration" of the type described in Patent Applications FR 2 855 805 or FR 2 887 211) on the (invisible) underside of the extension.

FIG. 1b also shows the opening 15 for the insertion of a screw for fixing the extension to the hanger in FIG. 1a. The ring 6 (FIG. 1c) placed inside the tube will form the spacer.

FIG. 1d shows the end plate or panel 2 of the extension. This plate has a generally flat zone 20, shaped to fit inside a vehicle, and provided with fixing openings 22-1, 22-2 and 22-3, in particular, to allow a front component such as an absorber (cushion) to be fitted. The openings 21 and 23 on the other hand are intended for positioning this bumper and any other element such as a pedestrian crossbar (or beam) that joins the two absorbers together.

The plate also comprises an upper edge 25, and two side edges, as shown at 26 or 27 (FIGS. 1d and 1f).

It accommodates, for example by welding at its base 91, an angle member 9 also provided with an offset 92, the whole being intended to be fixed to the hanger of the vehicle.

In the centre of the plate is a substantially circular opening designated 28, the function of which is essentially to make it easier to provide an anti-corrosion coating (for example by cataphoresis of the steel component) which will help to protect the extension or add-on assembly from corrosion after mounting.

As shown in FIG. 1f, according to the prior art, the end 10 of the extension tube 1 is welded to the front plate or panel 2. Here, the tube 1 and the plate 2 are made of steel. This end 10 encompasses the opening 28. The thick black lines indicate the weld seams (FIGS. 1d and 1f).

Owing to the fact that, in the embodiment shown, the tube 1 is fixed slightly obliquely to the plate 2, the section AA will pass through the flank of the extension. For this reason, FIG. 1g shows a closed end on the left. It also shows the passage through spacer ring 6 with its openings 15 and 16 (the latter with an inward flange), while the bottom of the alteration 12 is also shown in this same FIG. 1g.

In tests, a solution of this kind satisfies the basic tests in the general specification, at least as far as high speed crashes are concerned. However, problems remain for other types of impact, and in the transition to the production stage. In fact, in car manufacture, the components must, by their design and technical features, ensure very good reproducibility and identical behaviour in terms of energy absorption and deformation on impact (what is known as "programmed deformation".)

When a motor vehicle has crash safety components added to it, this has the effect of making the front of the vehicle heavier, generally too heavy in relation to the rear, on account of the presence of the engine block at the front, plus the other equipment located at the front of the vehicle, and therefore increases its inertia during impact and consequently aggravates the problem of crash safety.

Moreover, these additional components are integrated in the engine environment at the front of the vehicle which is already fully loaded and where the space available for integrating new components is very limited and has well-defined volumetric contours.

It is therefore desirable to make the added components lighter in weight while maintaining or improving their behaviour in the event of impact, and fitting them into the volume provided. Looking at aluminium, for example, which is lighter than steel, the following combinations could be achieved:

|  | tube 1 | plate 2 |
|---|---|---|
| CONVENTIONAL | steel | steel |
| Mixed 1 | aluminium | steel |
| Mixed 2 | steel | aluminium |
| Fully aluminium | aluminium | aluminium |

The combination "Mixed 2" is mentioned for the sake of completeness, although it will only be used in fairly rare or specialised cases.

The table first of all establishes the "conventional" situation in which the components are made of steel, and made from different parts put together by welding. This is generally welding using filler metal, which may be carried out using the MIG ("Metal Inert Gas") technique.

In order to attempt to reduce the weight of the vehicles thus equipped, one possible solution is to use materials such as aluminium or magnesium, for example, which have mechanical properties compatible with the data in the specification (in terms of overall performance) while remaining substantially lighter.

The different possibilities are listed in the table (for aluminium).

In terms of lightness, the ideal case is naturally aluminium/aluminium. However, it is known that welding aluminium to aluminium is difficult and costly.

More generally, where elements made of the same material are assembled by welding (the elements might all be made of steel, for example, or all made of aluminium), welding becomes difficult if the components to be assembled are too different in thickness. In fact, it is generally thought that the ratio of thicknesses of elements welded together is at most 1 to 2 in the case of aluminium and 1 to 3 in the case of steel.

However, the assembling of mixed materials is often necessary on account of particularly stringent mechanical characteristics that have to be ensured. Also, steel frequently continues to be the right material for certain parts of the component. For example, the case "Mixed 1" may be found where the plate could be made of aluminium but with too great a thickness for the maximum size allowed, whereas steel would fit. Steel may have superior mechanical features compared with aluminium (elastic limit in particular).

Thus, different materials have to be used for the extension tube and for the plate. And, when elements made of different materials such as steel and aluminium, for example, have to be joined together, there is currently no economically satisfactory welding technique available.

More generally, whatever the situation, the Applicants have observed troublesome phenomena on extensions in which the different elements are joined together by welding.

It is known, in fact, that when the different elements of a part are joined together by welding, there is a "heat affected zone" (abbreviated to HAZ in the art). In this zone, the elements of the part undergo local changes to their mechanical characteristics. It appears that these changes are prejudicial to their behaviour in the event of impact.

In short, assembly by welding risks affecting the mechanical characteristics of the component.

The problem of finding a solution to the joining together of the parts of the component, without causing any changes, even local ones, in their mechanical characteristics, thus remains unsolved at this stage.

The Applicants have worked on this. Thus, actual crash tests have been carried out under different conditions. During impacts with forces that can be broken down into an axial force and a torque, the Applicants have observed that:
   most of the stresses are localised in the "edges" (or angles) of the extension tube,
   whereas the intermediate walls exert only a small part of the energy absorption function which takes place chiefly in the "edges".

In other words, these new tests have shown that the intermediate walls (or sides of the polygon) have the main function of ensuring a mechanical connection between the edges of the polygon that makes up the extension tube. As a result, in order to meet the objective of making the material lighter, it is possible to envisage using a tube the thickness of which varies along its cross-section, i.e.:
   a thickness in the edges that makes the component capable of withstanding forces as defined in the specification, and consequently capable of complying with the deformation required by law,
   a lesser thickness in the faces of the tube, this thickness still being sufficient to provide an adequate mechanical bond between the edges in the event of impact.

Thus the edges may be made thicker.

Moreover, the question of the geometric precision of the assembly of the different elements may also be examined from the point of view of the method of transmission of the forces in the event of an impact which, as the Applicants have acknowledged, takes place chiefly via the "edges" of the extension tube. The result of this is that one technical constraint that has to be respected demands that the assembly of the front surface of the section of the extension tube with the front plate must be carried out such that the "edges" of the tube come to bear "perfectly" (in a well distributed manner) on said plate, at least during impacts.

Thus, a first aspect of the invention is the ensuring of the abutment of the edges. A second aspect is, at least in some embodiments, the division of the space available along the periphery of the tube between:
   on the one hand the edges, for the quality of the abutment of the edges on the plate, and
   on the other hand the tabs or lugs, for the quality of the attachment of the tube to the plate.

The tube is arranged as necessary so as to be thicker at its corners, so that the edges are thicker.

An embodiment of the invention will now be described with reference to FIGS. 2 and 3.

FIGS. 2a to 2g are similar to FIGS. 1a to 1g, and show the changes made, and only these will be described.

In FIG. 2a, the end 10 of the extension tube is now formed, on three of its sides, with three lugs 161 to 163, provided with precisely positioned bores. On each side the lug is intermediate between the ends of the side in question, without reaching these ends.

Here, the fourth side is provided with a notch 164 (FIG. 3a) which is intermediate between the ends of this fourth side, without reaching these ends.

In this way four edges 171 to 174 are defined at the four corners of the end 10 of the extension tube, and will be discussed below.

FIG. 2b is similar to FIG. 1b, except for the presence of the lugs and edges. Moreover, the end parts (caps) may be crimped instead of welded on.

Figure 2D:
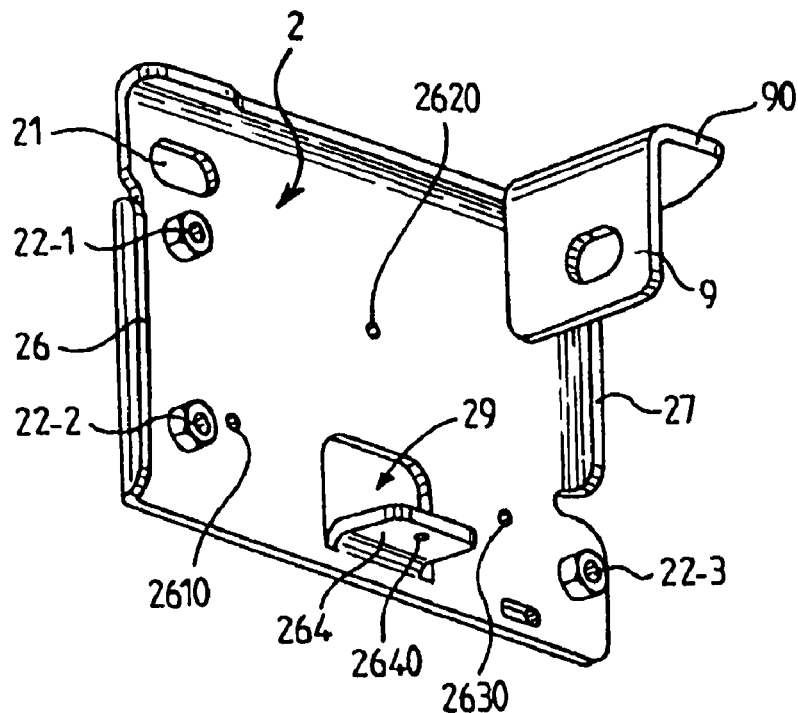
Figure 2E:
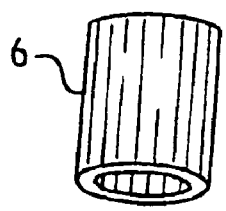

FIGS. 2c and 2e are identical to FIGS. 1c and 1e, respectively.

The plate in FIG. 2d on the other hand is different from that in FIG. 1d. First of all, the circular hole 28 is replaced by the line 29 of the cut-out of a fourth lug 264, which is also provided with a precisely positioned bore 2640.

Another difference is the shape of the angle member 9, which is cut out from the plate 2 in this case instead of being welded thereto.

Moreover, the attachment points and edgings have minor differences compared with the first embodiment described. The upper lug coming from the tube makes it impossible to add on an angle member (impossibility of assembly). The latter is thus formed from the plate.

The plate comprises bores 2610, 2620 and 2630, precisely positioned so as to correspond to the bores 1610, 1620 and 1630 in the lugs 161, 162 and 163.

FIG. 2f shows the extension tube mounted on the plate. It will be noted that in this embodiment the longitudinal axis of the extension slopes downwards (at a few angular degrees) and to the right (about 10 angular degrees).

As shown in FIG. 2b, the edges 171 to 174 are carefully trued to correspond to these angles.

Returning to FIG. 2f (and FIG. 2g), assembly is carried out as follows:
   the edges 171 to 174 are positioned so as to abut perfectly on the surface of the plate, with the bores 2610, 2620 and 2630 positioned opposite the bores 1610, 1620 and 1630 of the lugs 161, 162 and 163,
   the three lugs are then riveted to the plate through the pairs of bores 1610-2610, 1620-2620 and 1630-2630,
   the lug 264 provided on the plate is inside the tube forming the extension, in frictional contact therewith and, once again, riveting is carried out through a pair of bores 1640-2640 positioned so as to correspond to each other; the assembly with its rivet 86 is visible in FIG. 2g.

It is preferable to have reduced play between the riveted surfaces in contact with one another. The assembly process should allow for this constraint and ensure that the surfaces are clamped together during riveting.

The edges of the extension tube that bear on the plate are not necessarily limited to the radiated part (in the form of an arc) at the corner of the tube. They are complemented by a greater or lesser part of the side of the tube depending on the forces that are to be transmitted by the edges during low speed impacts (or so-called "pedestrian" impacts or "repairable" impacts). These forces depend on a calculation that takes account of the response of the crash cushions which act before the extension.

The spacer 6 has already been positioned in the tube 1 beforehand by pressing on the edge of the opening 16.

Figure 3A:
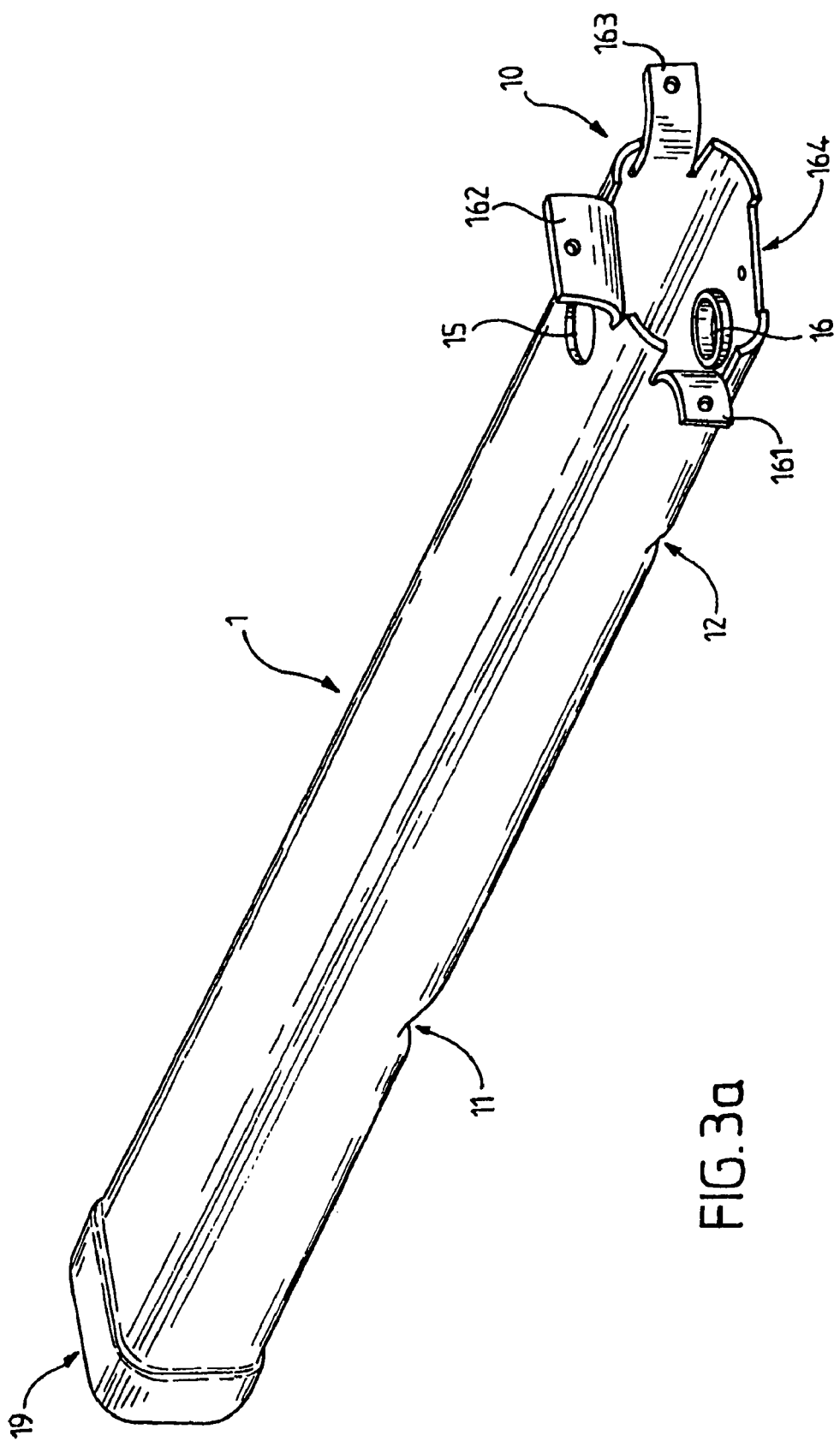
FIG. 3a is an enlarged perspective view of an embodiment of the tube of an extension according to the present invention.
Figure 3B:
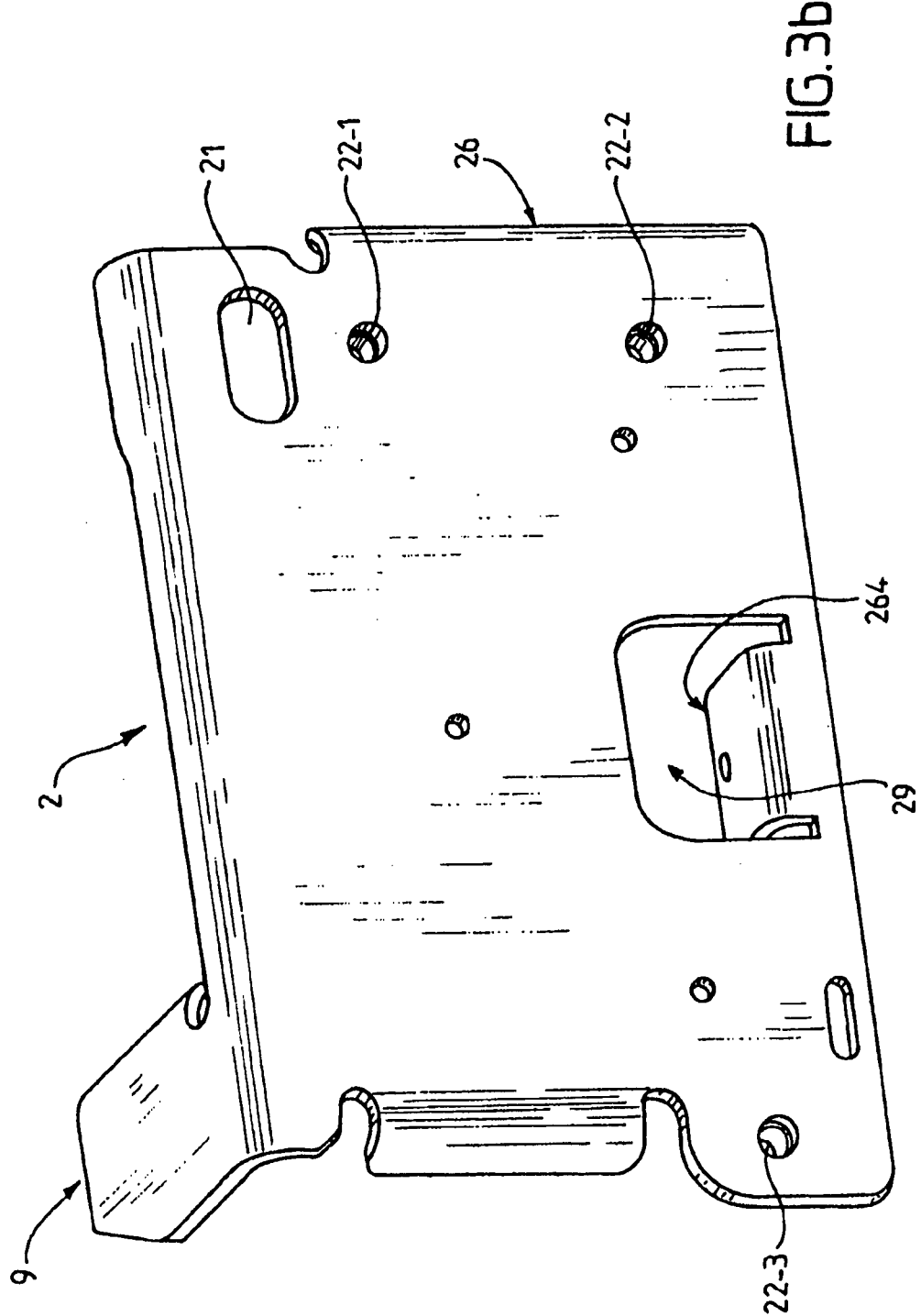
FIG. 3b is an enlarged perspective rear view of an embodiment of a plate or panel of an extension according to the present invention.

FIG. 3a shows the extension tube in more detail. Similarly, FIG. 3b shows the extension plate or panel in more detail.

In a particular embodiment, for example the one described hereinbefore, the extension may be manufactured on an integrated production line which comprises:

M1—a first press of the SPP type (operating by the "Squeeze-Push-Push" principle), M2—a special machine for punching, for positioning the spacer and for crimping, M3—a second press of the SPP type, M4—a second special machine for positioning the panel ("plate") and for riveting.

The manufacturing process may be broken down as shown in Table I below:

TABLE I

| Step | Action | Machine |
|---|---|---|
| A | Starting from a tube of the desired cross-section, fashioning the start 12 at the front end 10 of the tube and flaring out the rear end 19 of the tube | M1 |
| B | Fashioning the start 11 at the rear end 19 of the tube and calibrating the area of the front end 10 for the spacer 6 to pass | M1 |
| C | Straightening the tube | M1 |
| D | Punching for the spacer 6 | M2 |
| E | Positioning spacer and crimping it, i.e. carrying out the crimping 16 (flange) visible in FIG. 2g | M2 |
| F | Punching fine holes along the line provided for cutting out the tabs or lugs by shearing | M3 |
| G | Creating the lugs by shearing-rolling (rolling folds them at the same time) | M3 |
| H | Shearing the edges to bear on the plate | M3 |
| I | Adjusting the length of the lower lug | M3 |
| J | Punching the holes located on the tabs so as to receive the rivets | M3 |
| K | Positioning the cap 5 and crimping it to the rear end 19 of the tube | M4 |
| L | Positioning the plate and riveting it to the front end 10 of the tube | M4 |

These manufacturing data are provided as a non-restrictive example.

An extension like the one in FIGS. 2 and 3 has proved clearly superior to the one in FIG. 1 in terms of its behaviour on repeated impact at low speed.

It will be understood that the solution perfected by the Applicant is to create an extension the feature of which is that it comprises a tube bearing on the front plate via its edges, the faces of said tube being provided with cut-outs in the form of tabs or lugs which enable the extension tube to be attached to the front plate.

In the example described, the assembly is carried out by riveting the tube to the front plate.

To do this, lugs can be cut out from each of the faces (or wall) of the tube at its "front side" end and bent through 90° or at the appropriate angle when the front plate is not mounted perpendicularly to the axis of the tube. When space demands, for example, (at least) one of the lugs is formed in the plate instead of being formed in the extension tube. This is what is described above.

These lugs have a surface located in the same plane as the plane of the section formed by the front end of the tube.

In the example described, the lugs cut out from the extension tube are drilled with bores facing bores formed in the front plate onto which the tube bears with its edges, these bores arranged 2 by 2 facing one another enabling the assembly to be joined together by riveting. If appropriate, the (or each) lug cut out from the plate is drilled with a bore facing a bore formed in the tube.

The dimensions of the cut-outs formed on each (or some) of the walls of the tube at its end are such that:

on the one hand the dimensional characteristics of the edges bearing on the plate allow the forces and torque to be transmitted during an impact according to the vehicle specification, on the other hand the dimensional characteristics of the lugs ensure that the edges bear on the plate and that a tube-plate joint is formed in accordance with the vehicle specification.

The riveting does away with the HAZ of welding, inter alfa. Thus, full advantage is taken of the mechanical features of the profiled tube and of the plate, while avoiding the altered local characteristics which would be found in the HAZ in the event of welding.

The invention is not limited to the embodiments described hereinbefore but encompasses all the alternatives contained within the scope of the claims that follow, notably the alternatives mentioned below.

Thus, generally speaking, the assembly comprises at least one lug or tab formed at one end of the elongate part, and at least one lug or tab formed in the first end part.

The elongate part may be seen as a tube of generally polygonal cross-section. However, this tube is not necessarily straight. It may have one or more cambers.

If the contacting elements of the plate and the extension tube are made of the same material, it is possible to join them together by electrical spot welding.

The lugs may be made by cutting out from the sides of the extension tube. The projecting parts remaining in the corners are cut out to form the abutment zones or edges. In the latter case, the lug that has been formed from the plate may be fixed externally. It may also be inserted in the bore (inside the tube).

In this latter case, it would be possible to envisage a clip fastening or clamping of the lug inside the tube, provided that the connection retains good resistance to tilting, i.e. withstands the torque associated with the fact that the force is not along the axis. An example of this will be described below.

Figure 4:
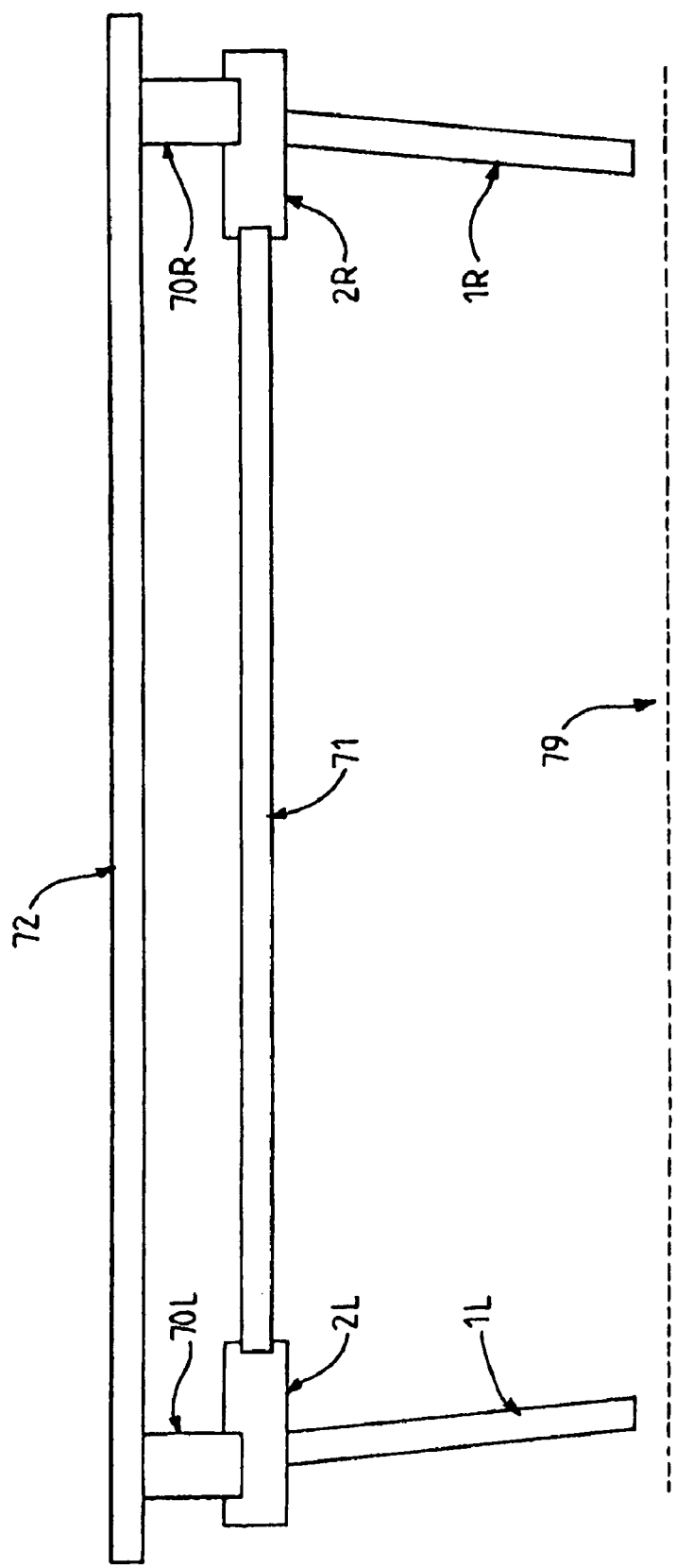
FIG. 4 is a schematic plan view of the device consisting of two extensions and a connecting crossbar, mounted on a front track, and FIGS. 5a and 5b schematically illustrate a possible variant of the invention.

The overall assembly may be carried out as shown in the highly schematic plan view in FIG. 4. Reference numerals 1L and 2L show the extension tube and plate located on the left, and similarly 1R and 2R show the extension tube and plate located on the right, mirror-symmetrically with respect to the obliqueness of the tube. The plates 2L and 2R are interconnected by the connecting bar 71. They are also interconnected by two crash cushions 70L and 70R to a pedestrian crossbar 72 located right at the front of the vehicle and shown highly diagrammatically. The crash cushions are sometimes integrated with the pedestrian crossbar. Also schematically, the dotted line marked 79 denotes the position of the chassis of the vehicle.

The above description envisages direct contact between the edges and the plate, with a connection provided by lugs that are integrally formed with the extension tube (or the plate). It is possible for the lugs to be separate elements, although currently the Applicants are of the opinion that the addition of intermediate parts tends to reduce the performance of the assembly.

A possible variant of the invention shown in FIGS. 5a and 5b will now be addressed. The Figures show the tube 1 and the plate 2. Here, the lugs 261 to 264 are obtained in a single block by stamping the plate 1. In this case it is currently preferable that the plate should be made of steel. In fact, the lugs are now connected to one another and form the four sides of the stamped part, with rounding at the corners, as shown at 291. Naturally, the four corners have the same type of rounding. The radius of this rounding is greater than the radius of the rounded corners of the edges 171 to 174 (173 not shown) of the tube. At 181 and 182 (other zones not visible) there is a local cut-out to limit the contact of the end of the tube with the edges 171 to 174.

Assembly may be carried out using rivets in the holes shown in the drawings, and the tube and stamped part that are fitted together may be clamped in position.

Moreover, the foregoing description relates essentially to the case of the front plate of the extension. The same type of solution may be applied to the connection between the tube that forms the extension and its rear interface.

Naturally, some of the means described hereinbefore may be omitted from the variants in which they are not required.

The solution of assembly by riveting has the following technical advantages:

1. the possibility of joining different materials together
2. the possibility of joining together components of very different thicknesses
3. the possibility of adapting and varying the thickness of the tube in its cross-section, thereby making the component lighter
4. the absence of deformation caused by heating during welding, resulting in better dimensional tolerances of the component and simplifying the assembly tools, which thus become less expensive
5. the absence of any residual stresses and heat affected zones modifying the technical characteristics of the component after welding together the different parts, with the result of better behaviour during impact from one component to another identical one (mechanical characteristics unaffected)
6. reduction in the assembly costs (riveting is less expensive than conventional welding with or without filler wire).

Alternatives such as the solution of electrical spot welding may have the same advantages, at least in some cases.

It is also possible to envisage, at least when the plate is made of steel, that threaded bores or built-in nuts can be used to screw on the extension tube the lugs of which are provided with corresponding perforations.

The invention claimed is:

1. A mechanical device forming an elongated structural element of a vehicle, intended to at least partially absorb some impacts, comprising:
   a profiled or tubular elongate part of generally polygonal cross-section;
   a first end part mounted at a first end of the elongate part, at an angle that is substantially perpendicular to the axis of the elongate part, the first end part configured to be fixed to other elements of the vehicle,
   wherein close to its first end, the elongate part comprises cut-outs that create adjusted zones or edges in the vicinity of edges of its cross-section,
   wherein between the elongate part and the first end part a rigid fixing holds the adjusted zones substantially bearing directly on the first end part, and
   wherein the adjusted zones are dimensioned so as to withstand compressive forces and a tilting torque during impact, and
   wherein the other elements of the vehicle fixed to the first end part includes either a crash cushion, or a connecting bar extending to another end part mounted to another elongate part.

2. The device according to claim 1, wherein the rigid fixing comprises at least one rivet.

3. The device according to claim 1, wherein at least some of the cut-outs are made in a form of a bent back tab or lug that contributes to the rigid fixing.

4. The device according to claim 1, wherein the first end part comprises a cut-out in a form of a bent-back tab or lug that contributes to the rigid fixing.

5. The device according to claim 4, further comprising at least one tab or lug provided at one end of the elongate part, and at least one tab or lug provided in the first end part.

6. The device according to claim 5, comprising three tabs or lugs formed at one end of the elongate part and one tab or lug provided in the first end part.

7. The device according to claim 6, wherein the rigid fixing comprises at least one rivet for each tab or lug.

8. The device according to claim 1, wherein the rigid fixing comprises at least one spot weld for at least some of the tabs or lugs.

9. The device according to claim 1, wherein the rigid fixing comprises at least one screw/thread assembly for at least some of the tabs or lugs.

10. The device according to claim 1, further comprising a second end part mounted at the other end of the elongate part, this second end part being configured to bear on other elements of the vehicle.

11. The device according to claim 1, further comprising a crimped joint provided at one of the ends of the elongate part.

12. The device according to claim 1, wherein at least one lug is formed by stamping a plate.

13. The device according to claim 1, wherein the crash cushion extends from the first end part to a connection to a pedestrian crossbar.

14. The device according to claim 1, wherein the adjusted zones extend in a longitudinal direction defined by the axis of the elongate part.

15. The device according to claim 14, wherein the rigid fixing holds a an end face of each of the adjusted zones substantially bearing directly on the first end part along a circumferential length of the end face of each of the adjusted zones.

* * * * *